United States Patent [19]
Walker et al.

[11] Patent Number: 5,363,582
[45] Date of Patent: * Nov. 15, 1994

[54] AUTOMATIC HOOKING DEVICE

[76] Inventors: Wade A. Walker, Rt. 3, Box 39, Hallsville, Tex. 75650; Danny C. Reaves, Rt. 7, Box 260, Longview, Tex. 75602

[*] Notice: The portion of the term of this patent subsequent to Sep. 15, 2007 has been disclaimed.

[21] Appl. No.: 186,553

[22] Filed: Apr. 27, 1988

[51] Int. Cl.⁵ .............................. A01K 97/00
[52] U.S. Cl. ....................................... 43/15
[58] Field of Search .................. 43/15, 16, 17

[56] References Cited
U.S. PATENT DOCUMENTS

| | | | |
|---|---|---|---|
| 422,331 | 2/1890 | Bradford | 43/15 |
| 619,819 | 2/1899 | Zack | 43/15 |
| 1,549,405 | 8/1925 | Bjurstrom | 43/15 |
| 1,859,944 | 5/1932 | Waitt | 43/15 |
| 3,271,891 | 9/1966 | Hancock | 43/15 |
| 3,451,155 | 6/1969 | Huliew | 43/15 |
| 3,798,821 | 3/1974 | Bybee | 43/15 |
| 4,043,069 | 8/1977 | Zahner | 43/15 |
| 4,309,838 | 1/1982 | Hodshire | 43/15 |

*Primary Examiner*—Kurt Rowan
*Attorney, Agent, or Firm*—Robert Nisbett

[57] ABSTRACT

This invention provides a hook setting device which uses levers to provide the desired force multiplication factor and force pattern to a fishing line where the force is supplied by one or a combination of tension or compression force means. A trigger means and cautilevered weight of the apparatus provides an initial force or resistance to set the hook in the fish and the levers and force means maintain a preselected force pattern and intensity on the fishing cord.

9 Claims, 5 Drawing Sheets

AUTOMATIC HOOKING DEVICE

FIELD OF THE INVENTION

The apparatus of this invention relates to fishing and provides one or more devices for setting the hook in a fish after the fish has exerted a predetermined force which can be varied. The device can maintain a preselected amount of tension on the fishing line or cord which can also be varied by preselection of force means and the length of stroke of the device.

DESCRIPTION OF THE PRIOR ART

There are many prior art patents which relate to fishing and many disclose devices and methods with which this invention may be used. These patents are listed in U.S. Class 43 of the U.S. Patent Office Classification Manual. These relevant patents which can be used with or used to modify this invention are incorporated herein by reference. Some of the patents in this class deal with automatic hook setting devices. Two such patents are: U.S. Pat. Nos. 4,124,948 to Mautner and 4,492,053 to Poulin both of which are incorporated herein by reference.

Devices of the prior are for specialized applications and are very complex making them of very limited use for specific applications, difficult to use and subject to numerous problems as is evident from the patents.

This invention provides several embodiments of a relatively simple hook setting device which has very general and broad application and utility. The devices are very simple and easy to use and maintain. This family of devices is referred to as Texas Stump-Popper fishing devices. Each device is durable and can be used in all types of weather, all types of environment and with a very broad range of size of fish or other marine creatures which are typically caught by a line and hook. The devices of this invention can be used in a manner so that the cord with which they are used is not damaged and there is no danger of losing the hook or other down-line equipment due to failure of the line or over loading of the hooking device. In addition the mounting point for the hooking device of this invention can be of any type such as a rod, boat, float, stump, limb, ring, another line, or any other convenient mounting means. The cord length above and below the device can be varied to as short or as long a length as desired and, in fact, the device can be used with or on existing fishing devices and lines either above or below the water surface. Certain embodiments of the invention are particularly adapted to prevent entanglement with typical fishing hazards such as brush, limbs, longs, stumps, moss, weeds or other lines.

Other advantages, distinguishing features, modifications and embodiments of the invention will be apparent to those skilled in the art from the description and embodiments set forth herein.

SUMMARY OF THE INVENTION

Generally and broadly the hook setting apparatus of this invention can be considered a lever actuated hook setting device comprising at least two elongated lever members which are pivotably joined at one end and each of said two lever members has a cord section attached near the distal end which is fartherest from the pivot point. One cord section, i.e. the first cord member is attached to some type of support and the second cord section is attached to some type of hook apparatus. The said two lever members have a force means attached to them which tends to cause the two lever members to pivot about said pivot point towards each other and the said two lever members have a trigger means attached to them which initially holds the two said lever members in a fixed relationship to each other and which is released by some predetermined pattern of tension forces applied to the two said cord sections thereby allowing the tension means and two said members to maintain a predetermined pattern of tension forces on said two cord sections over a predetermined distance when something such as a fish is hooked or caught on said hook apparatus. This hooking apparatus can be adapted according to the teachings herein to allow a fish to take the hook apparatus securely before a significant tension is applied to the cord sections by the apparatus. After the fish exerts the tension forces to the hook and cord or line according to a predetermined, intensity, number of tension pulses, or some other pattern the apparatus applies tension to the cord and hook which sets the hook in the fish's mouth and maintains tension on the cord according to a predetermined pattern as set by the particular arrangement of levers and force means. For example, the apparatus may maintain a relatively constant force over the entire stroke of the levers or the apparatus may be arranged to increase the force toward the end of the stroke or the apparatus may be arranged to provide additional forces at certain steps of the stroke of the levers. Stroke is defined to indicate the rotating or pivoting of the two levers relative to each other and away from each other as caused by force or tension applied between the two cord sections. This is also referred to as extension of the apparatus. The stroke begins when the levers are closest to each other or at the smallest angle relative to each other. The end of the stroke or greatest extension would be when the two levers are at a position with the greatest or largest angle between them or the distal ends of each lever are fartherest from each other.

DESCRIPTION OF THE DRAWINGS

FIGS. 1 through 5 set out embodiments of the invention including several optional features and several alternate versions specific features.

DESCRIPTION OF PREFERRED EMBODIMENTS

Referring to the drawings, several preferred embodiments of the invention including some optional and alternate features are shown in FIGS. 1 through 5. Other combinations and embodiments of these features will be apparent to those skilled in the art from the disclosure herein.

Figure 1:
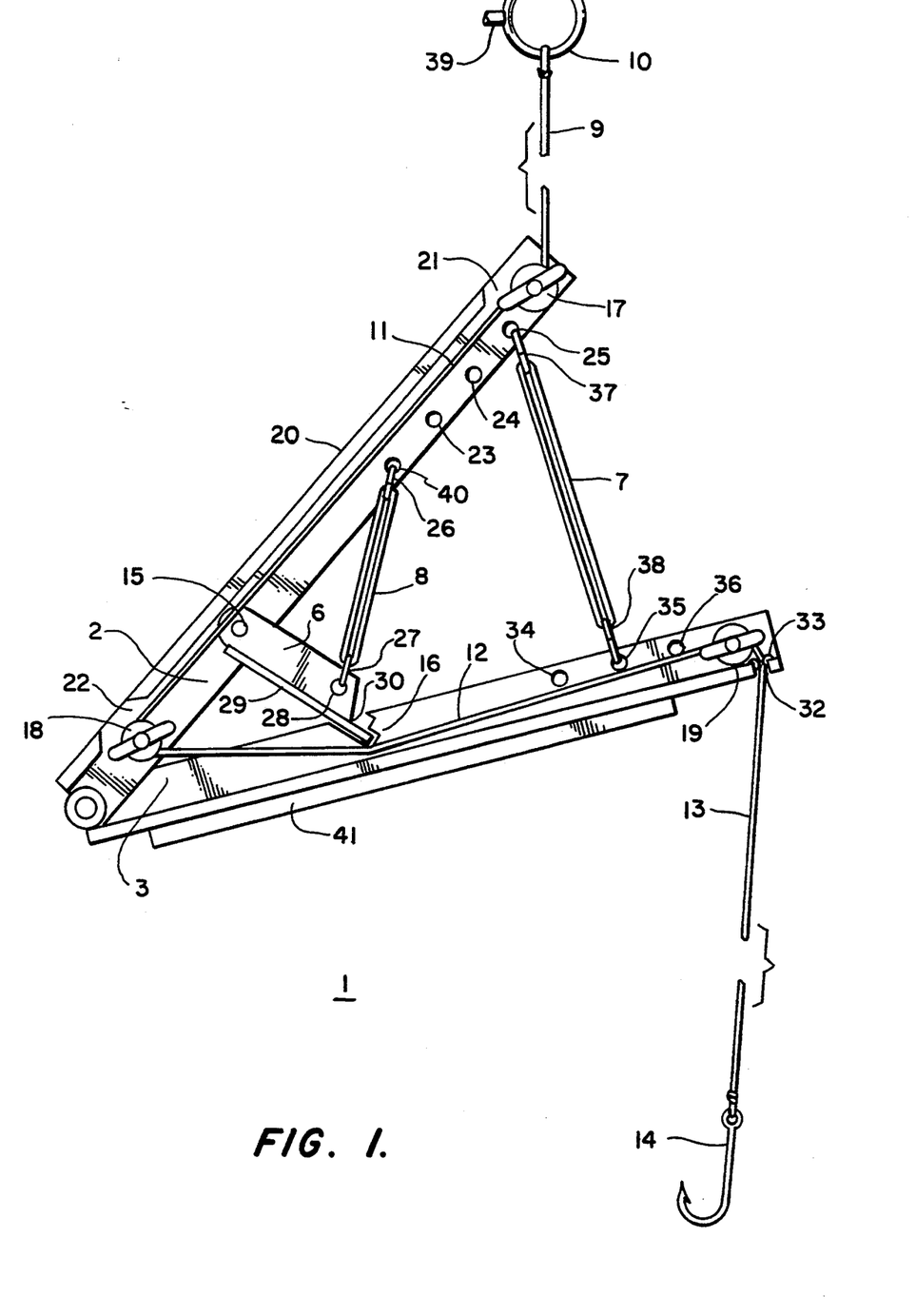
FIG. 1 is a side elevation of one of the simplist embodiments of the invention.

FIG. 1 shows a side view or elevation of one embodiment with two actuating levers and one single force means. FIG. 1 shows a hook setting apparatus 1 consisting of two elongated lever means with first lever 2 connected to second lever 3 by pivot point 4 having a washer 5. The pivot point can be constructed any of several conventional components such as a brad or bolt as shown by 4 and may have a washer or other bearing component such as 5 which allows the two levers to pivot freely but holds them rigidly in one plane. This makes it possible to use only two relatively simple levers rather than a more complex multiple lever, trigger means and force means. Mounted on one of the lever members 2 is a trigger means consisting of a lever 6 and a tensions means 8 with the lever 6 designed to engage the other lever member 3 at notch 16 as shown. This allows the trigger lever to move up each step as small increments of force or tension are applied to cord sections 9 and 13 causing levers 2 and 3 to pivot away from each other or to pivot thereby increasing the included angle between the two levers. The force means of the trigger means consists of an elastic means or rubber band 8 connected by S-hooks 26 and 27 to the levers 2 and 6 at holes 28 and 40 tending to cause the trigger lever 6 to pivot about the pivot point 15. As shown in FIG. 1 when one large or several smaller pulses of tension or force are applied to cord sections 9 and 13 which are sufficient to move lever members 2 and 3 relative to each other and against the tension maintained by force means 7, tension means 8 causes trigger means lever 6 to pivot counter-clockwise as shown and allows the trigger means lip 30 to move through all or one or more of the notch steps shown at 16 and thereby disengage from lever member 3 thereby freeing lever members 2 and 3 to pivot, freely through the full stroke produced by force means 7. The trigger means can be adapted to mount on either lever member 2 or 3. It could also be adapted to fall free of both lever members and might be retained by another cord just so the trigger means is not lost when it disengages. As shown in FIG. 1 when the trigger means 6 disengages, tension means 8 should cause it to pivot or rotate a sufficient distance to be out of the way of both lever members 2 and 3, so that it does not obstruct free movement of the levers. The force means 8 can be mounted on lever 2 at any of the holes 40, 23, 24 or 25 as shown. Additional holes or other mounting means can be used on any of the levers. The S-hooks are shown as one convenient method of attaching the force means so that the attachment point can be selected thereby adjusting or modifying the tension forces and pattern of tension forces applied between various levers. Other attachment methods and means can be used such as hooks built in or attached at various points along the lever member. Also several elastic means or rubber bands can be used to vary the tension force and pattern. Where more than one rubber band is used, they may be attached by one S-hook mounting means or each band may be mounted at different points with different attachment means. Likewise, the force means can be of different strengths, of different types, etc. so that the tension forces and pattern can be adjusted to produce tension forces which are relatively constant over the stroke of the levers, which increase or decrease over the stroke or at certain points along the stroke of the levers to give the desired hook setting and landing action on the fish on hook 14. The force means 7 can be mounted using S-hooks 37 and 38 in any of the various holes 40, 23, 24 or 25 on lever 2 and in any of the various holes 34, 35 or 36 on lever 3. Likewise there may be other holes or attachment means located along each of the levers shown.

The lever members 2, 3 are 6 are constructed of an L shaped material such as aluminum angle. Other suitable materials of construction can be used such as wood, other metals, ceramics, polymers, composites, and combinations thereof. Selection of the materials and configuration for each of the various components will depend upon the strength, corrosions resistance, wear resistance, weathering resistance, cost and similar considerations. The elongated levers are required to transmit the desired forces, reciprocate or pivot freely and maintain substantially linear or rigid orientation. The design, strength and materials of construction of the pivot joints or pivot means also affects the above considerations and must be balanced with the choice of materials and design of the levers and other components. For example, simple planar levers could be used with the right selection of materials and properly designed pivot joints. An I beam type lever could also be used by slight modifications in the pivot joints and other components. For example, pivot joint extensions could be used or a separate pivot joint could be mounted on an outer flange off the I-beam levers. In another version, sections of the flanges could be cut away or notched for clearance of the various components. Such notches in flanges are shown in the L-section levers in FIG. 1. At 22 and 21 the flange section 20 of lever 2 is cut away or notched for clearance of the cord attachment means 17 and 18. On lever 3 at cord attachment means 19 flange section 31 is not notched indicating that attachment means 19 is offset enough for the wing nut at 19 to clear the flange. This offset is done at 19 because the cord 12 and 13 secured by attachment means 19 is aligned with hole 32 in flange 31 so that it freely passes through hole 32 and guide means 33. Upper cord section 9 is shown supporting the hook setting device 1 by being attached to ring 10 by a knot and ring 10 is attached to some fixed or moveable object (not shown) by shaft 39. The apparatus can be attached to any conventional object or mounting means in view of the teachings herein. Cord section 9 attaches to the hook setting apparatus at the attachment means 17. Attachment means 17 is shown as a wing-nut on a shaft. The Cord section is looped around the shaft or friction washers can be used under the wing-nut to hold the cord section. Friction washers (not shown) can be simple cork washers or similar materials that can hold the cord without causing damage to the cord. The cord section then passes along lever 2 as shown at 11 to another cord attachment means 18. This and additional cord attachment means are optional and serve to store extra or lengths of cord not being used. Simple notches or other conventional methods can be used to hold unneeded cord so that the length of the upper cord section and lower cord section can be set at the desired length without damaging or cutting the cord as shown in FIG. 1. That is, both upper and lower cord sections are one continuous cord member. The extra cord attachment means serve to store cord and to keep the cord free of the moving parts of the hooking apparatus thereby preventing damage to the cord. From the second cord attachment means the cord goes along the second lever 3 to the cord attachment means 19 then downwardly through cord guide 33 and hole 32 as shown at 13 and attaches to hook 14 at some predetermined depth. Also shown in FIG. 1 is a section 41 attached along the L-section lever flange 31. Section 41 is a hook-keeper material such as cord, wood, plastic, and such like that can hold hook 14 when the cord section 13 is wrapped around the apparatus or flange 31 and not being used. This hook-keeper section is optional but serves to protect the hook and to prevent a loose hook from causing damage, injury or entanglement. This hook-keeper section can also be attached to other portions of the apparatus such as the inside of flange 31 or to either side of flange 20, or even the flat vertical sides of lever members 2 or 3 or even 6.

Figure 2:
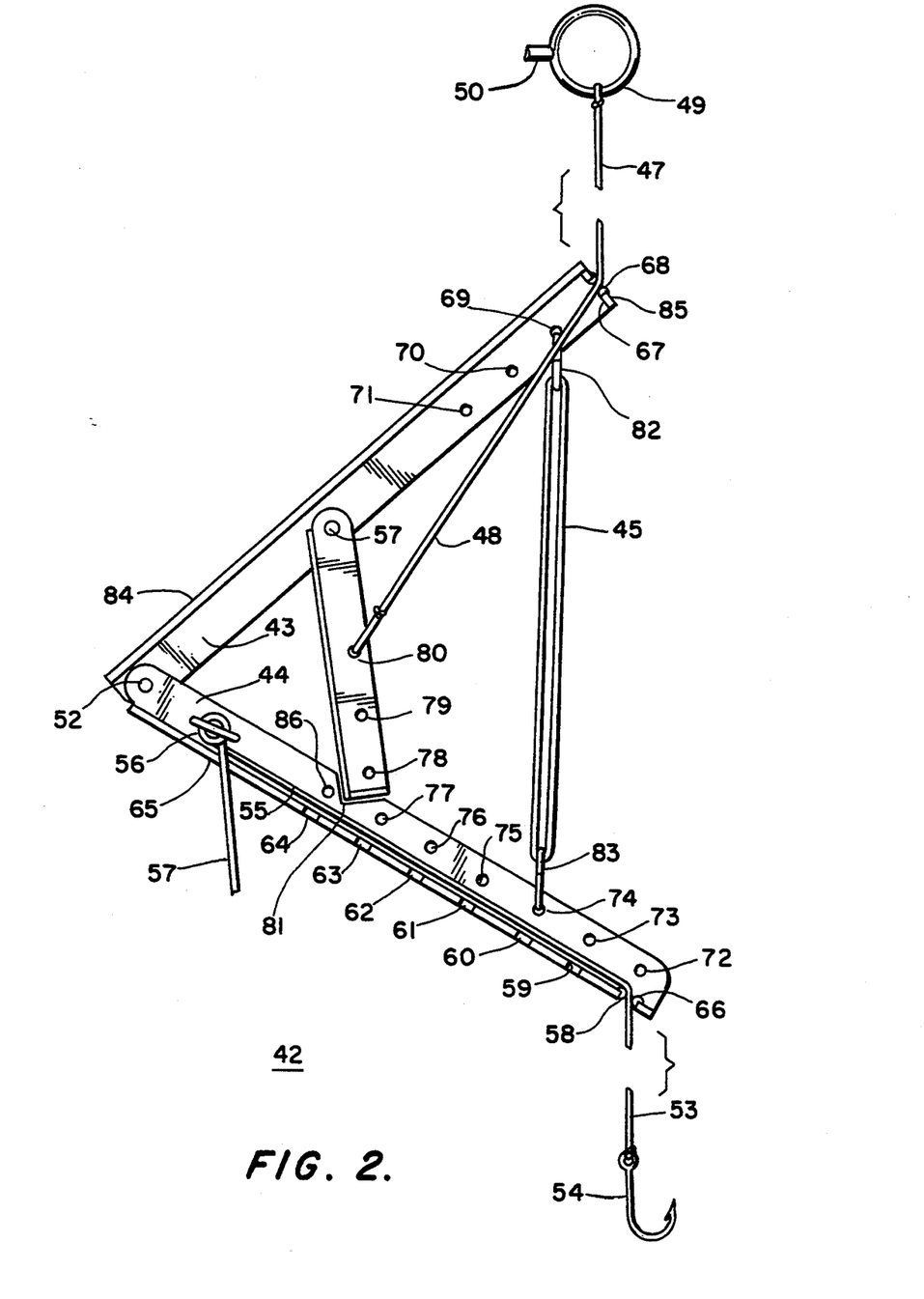
FIG. 2 is a side elevation of another relatively simple embodiment of the invention.

FIG. 2 shows an elevation or side view of another embodiment of this invention. In FIG. 2 the hook setting device 42 is supported by cord member 47 from ring 49 by a fixed support (not shown) through shaft 50. Cord section 47 passes through cord guide 68 mounted in hole 67 which is in the end flange 85 of lever member 43. From cord guide 68 cord section 47 goes to trigger means 46 as shown at 48, cord sections 47 and 48 are attached to the support ring 49 and trigger means 46 by a simple loop and knot arrangement. Other conventional means of attachment can be used. Trigger means 46 is attached to upper lever member 43 at pivot point 51 so that a tension force of sufficient magnitude applied through cord sections 47 and 53 will reduce engagement forces on the trigger means at notch 81 and allow said tension force applied through cord section 48 to pivot or rotate trigger means 46 to disengage said trigger means from lower lever member 44. The tension forces in cord section 48 then pivot trigger means 46 away from lower lever member 44 and toward upper lever member 43 allowing both lever members 43 and 44 to pivot freely at pivot point 52 relative to each other. Upper lever member 43 and lower lever member 44 are firmly and pivotably attached to each other at pivot point 52 in a manner that allows them to pivot or rotate through at least an angle of 180 degrees freely relative to each other and firmly enough to maintain the movement of both levers and the appurtenant devices operating in substantially a single plane. The plane of operation can rotate 360 degrees about an axis defined by cord sections 47 and 53 but all of the appurtenent devices such as trigger means 46 and trigger means 45 substantially remain in one plane of operation. In other embodiments some components can operate in other planes. For example the trigger means 46 can be designed so that it moves in a plane which can be 30 degrees to 90 degrees with the plane of movement of the upper and lower lever members 43 and 44. Attached to upper lever member 43 near its upper or distal end from said pivot point 52 is a force means 45.

In FIG. 2 force means 45 is connected to upper lever member 43 and lower lever member 44 through S-hooks 82 and 83 at hole 69 and 74 respectively. The S-hooks are shown as one convenient method of releasably attaching a means for applying a force between said upper and lower levers which tends to pivot or rotate said levers together counter to the forces applied to said levers through cord sections 47 and 53. By using S-hooks, such as 82 and 83 respectively, the elastic member or rubber band shown as part of the force means at 45, the force means can be attached to the upper lever at anyone of the points of attachments or holes shown at 71, 70 and 69. In addition there can be other attachment points and if the force means is composed of more than one elastic members each could be attached at the same or different points. Likewise, several tension members could be used with each member having the same or different strength patterns. For example, several members could be used with relatively low but constant force pattern over the stroke of the lever members to provide relatively constant tension force which is multiplied or reduced by the lever members. In addition, one or more tension members could be used which exert a greated tension force toward the end of the stroke of said levers so that the tension would increase as a fish pulls on cord section 53 thereby reducing the tendency of the force exerting a suddenly large force on the cord sections or in other words reducing the tendency or ability of the fish to snap or jerk on the cord sections on hook setting apparatus thereby causing failure of any cord section or member.

As mentioned above, the arrangement of the cord sections 47 and 53 in relation to the force member 45 can be varied to use the lever members 43 and 44 to multiply or divide, increase or decrease, the tension force exerted by force member 45 on cord sections 47 and 53. For example, as shown in FIG. 2, since cord sections 47 and 53 are mounted further away from pivot point or fulcrum 52 that arrangement would tend to reduce the tension on the cord sections relative to the tension force in force means 45. In another arrangement, cord section 53 as well as cord guide 66 could be located at any of the attachment points or holes along the lower lever member 44, specifically at points 59, 60, 61, 62, 63, or 64. If the cord section 53 is located closer to the pivot point 52, the lever member would tend to increase or multiply the force in force member 45 as exerted on cord sections 47 and 53. The ratio or multiplication or reduction would be that of the ratio of the relative distances from the pivot point to the attachment points for the force means and to the attachment points of the cord sections. As shown in FIG. 2, the force means 45 also has several attachment points on both the upper lever means, namely points 69, 70 and 71 and the lower lever means namely points 72, 73, 74, 75, 76, 77, and 86. This range of attachment points makes it possible to vary the multiplication factors for the tension forces on both the upper and lower lever means over a wide range which can be used to fit a wide range of fishing conditions.

In FIG. 2 the trigger means 46 is actuated by cord section 48 when force is applied to cord sections 42 and 53. For example, when sufficient force is applied to cord section 53 by a fish on hook 54, the force tends to move lever members 43 and 44 away from each other and relieves pressure on the trigger means 46 at notch 81. If the force in cord sections 42 and 53 is great enough and applied for a sufficient length of time, the force is transmitted through hole 67 and line guide 68 through cord section 48 to pivot the trigger means lever 46 about pivot point 51 and away from the lower lever 44 and notch 81, thus disengaging the trigger means from the lever and allowing both lever members to move freely relative to each other in response to the tension forces in the force means 45 and cord sections 47 and 53. The point of attachment of cord section 48 to the trigger means such as holes 78, 79 or 80 will affect the forces required to disengage the trigger means and the speed of response of the trigger means to those forces. For example, as shown in FIG. 2 the attachment would produce the fastest response but would require a larger force than attachment at point 78. Likewise, the friction or drag exerted on the upper cord section 47 and 48 by line guide 68 would affect the force required and response time. For example a high drag at this point could be used to increase the force required and the response time.

The line guides 68 and 66 are optional and can be used to reduce wear on the cord sections, to reduce friction or to prevent entanglement of the cord sections. The guides can be made of conventional materials such as plastic, ceramic, metal, wood, cork, a composite or combinations thereof.

As shown in FIG. 2 the cord sections 48 and 55 can be attached to the apparatus by several methods. A simple loop and knot is shown at 80 while a wing nut, bolt and friction arrangement is shown at 56 so that cord section 57 shows excess cord depending from the lower lever member which allows adjustment of the length of cord sections 53.

Likewise, the various lever members 43, and 44 are shown with an L shaped or angle cross-section or configuration with flanges shown at 84, 85 and 56 respectively. At 85 the lever member 43 has an end flange on which line guide 68 is mounted and through which line 47 passes at 67 to 48. Likewise, trigger means 46 is shown as an angle shaped member with both side and end flanges which are not numbered.

Figure 3:
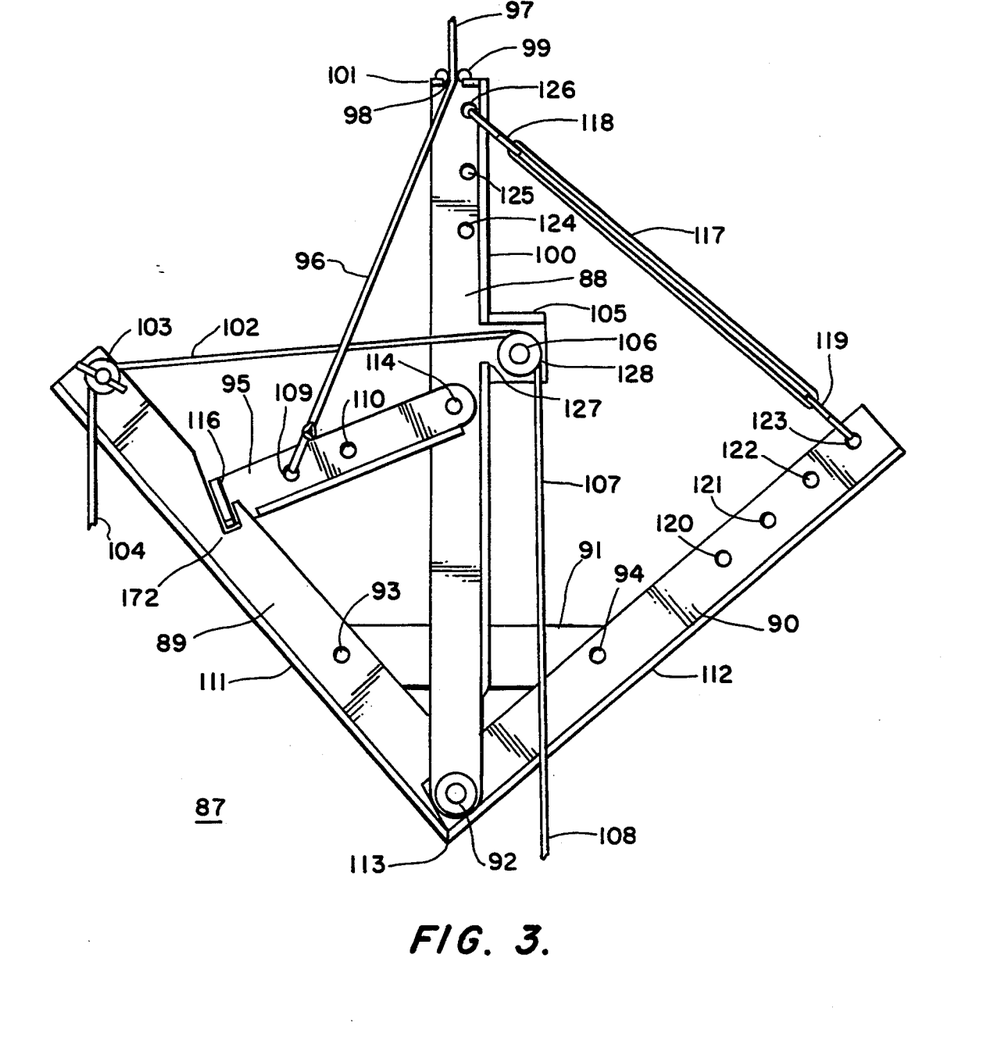
FIG. 3 is a side elevation of a more elaborate embodiment of the invention.

FIG. 3 shows another embodiment of the invention in which the center of gravity of the hook setting device 87 is more nearly in line with the upper supporting cord section 97 and the lower cord section 108. This arrangement allows the apparatus to function without significant movement of the apparatus itself with respect to the line or axis of forces applied through cord sections 97 and 108. Since parts of the apparatus as shown in FIG. 3 will move from side to side as the apparatus functions but not to the same degree as the apparatus shown in FIGS. 1 and 2. For example, as shown in FIG. 1, the center of gravity of the hook setting apparatus would be approximately mid-way between the pivot point 4 and the distal ends of the lever members 17 and 19 respectively and halfway between the two lever members. With the weight of the apparatus appearing to be concentrated at the center of gravity, the weight would add a rotation action to the apparatus which would tend to rotate the apparatus counter clockwise until the center of gravity was approximately directly under the supporting upper cord section 9. This rotation would tend to raise the lower cord section 13 and hook 14 upward by the amount attachment means 19 rotated upward about the center of gravity. This counter clockwise rotation could be off-set by the weight of the lower cord section 13, the hook 14 and any other objects, such as weights, floats, etc. that can be conventionally attached to a fishing apparatus. The fish applying tension to the hook 14 and lower cord section 13 would be initially working against this rotation and could produce a clockwise rotation or a rocking motion of the hook setting apparatus. This motion would help set the hook 14 tending to prevent the fish from striking the hook and getting away. This rotation or rocking feature makes it possible to visibly see when a fish is striking the hook to help keep the hook baited and provides a small initial resistance to the fish when it tries to take the baited hook thereby reducing loss of bait without hooking the fish that strikes the bait. Another advantage of the embodiments shown having an elastic band tension member is the fact that the hook setting apparatus works particularly well under windy conditions. Typically, windy conditions reduce the likelihood of catching fish but the elastic band frequently produces a vibration in the wind which attracts fish even under windy conditions. The elastic band or bands can be selected to accentuate this vibration as to frequency, intensity and the amount of wind required to produce the vibrations.

FIG. 3 shows an embodiment of the hook setting apparatus 87 which has a substantially vertical lever member 88 which is supported by upper cord section 97 through guide means 99 mounted in hole 98 in end flange 101. The cord section 97 goes to trigger means 95 as shown at 96 and is tied in hole 109 by a simple loop and knot as shown. Upper cord section 97 is supported by some conventional support means which is not shown. Trigger means 95 is pivotably mounted at 114 on the vertical lever member 88 and engages a first lever member 89 at notch 172. The trigger means 95 is shown as an L-shaped angle member with a side or bottom flange 115 and an end flange 116 on the vertical flange or rib which is substantially the same as the other lever and trigger members shown in each embodiment. As indicated herein, other structural shapes can be used for the lever members and other components of this in view of the teachings herein. Trigger member 95 is also shown with another attachment point, hole 110, for the cord section 96 by which the force requirements and response characteristics can be varied. The first lever member 89 is pivotably mounted on the vertical lever member 88 at pivot point 92. First lever member 89 is attached to second lever member 90 by a connecting member 91 at connecting points 93 and 94. These connecting points can be releasable or removeable so that the apparatus may be disconnected at one or both of this points and folded substantially flat along side the vertical lever 88. Convention connection means, such as bolts and nuts, brads, screws, dowel rods, and such like can be used for these connection points. Under some circumstances one of these connection points might be pivotable and the other might be moveable along the lever member so that the two lever members move in a complex fashion relative to each other. For example the connecting member might be pivotable at 93 and connected to the vertical lever member in a fashion so that it slides and pivots about a point on the vertical lever member and the connection point 94 would slideably engage some point or surface on the second lever member 90 so that a movement of the first lever member 89 would produce a corresponding movement in second lever member 90 which was multiplied by some factor in the range of about 0.6 to 1.5 through the connecting linkage.

As shown in FIG. 3, first lever member 89 is connected directly to second lever member 90 so that a rotation of the first lever member 89 produces a like rotation of the second member 90 which is also pivotably mounted at pivot point 92 on the vertical lever member 88. Once the trigger means 95 is disengaged both first lever member 89 and second lever member 90 move or pivot freely about pivot point 92 in response to the various forces applied to tile levers. The first and second lever members can also be fixably attached to each other or they can be attached for limited engagement or travel relative to each other through connecting means 91 or at point 113 where the base or side flanges 111 and 112 of the respective levers met. The levers can be welded at this point for a permanent fixed position or they can be removable joined at this point by some conventional means such as a screw, nut and bolt or such like arrangement.

As shown in FIG. 3, the first lever member 89 has a second cord section 102 mounted at its distal end by an attachment means 103. As shown the attachment means is a friction engagement apparatus so that the length of the cord section can be adjusted with excess cord depending from the apparatus at 104 and the other end of the cord section passes as shown at 102, 107 and 108 over a pulley arrangement 128 mounted at pivot point 106. The lower cord section 108 decends downwardly to a hook and other conventional fishing apparatus (not shown) below point 108. The pulley means 128 can be a simple pulley as shown designed merely to change the direction of travel of the cord sections 102 and 107 would be different sections and the tension force in each section multiplied by a factor in the range indicated above by using a pully with two sections or sheaves of different diameters. A complex pulley would also produce different lengths of travel for movement of cord section 102 relative to cord section 107. Conversely upper cord section 96 and 97 can be the same cord as indicated at 102, 104, 107 and 108 if the right type of attachment means are used at the various points for the various cord sections. The pulley means 128 should be designed to reduce drag and friction. The pulley means 128 is mounted on a shoulder 105 which is shown as a small L shaped angle member welded on the vertical lever member 88 with a notch 127 cut in side flange 100 to allow free passage and movement of cord section 102 over the pulley means 128.

A force means 117 is attached to the vertical lever member 88 near its upper end at the attachment point shown as hole 126. It can be attached at holes 124 and 125 also using S-hook 118. The force means is operated by an elastic band, such as a rubber band, which is attached by another S-hook 119 to the distal end of the second lever member 90 through one of the attachment points shown as holes 120, 121, 122 and 123.

As shown in FIG. 3, the hook setting apparatus is in the set or cocked position with the trigger means 95 engaged with first lever member 89 at notch 172. Tension member 117 maintains a force between notch 172 and trigger means 95 so that friction holds the trigger means engaged. When sufficient force or tension is applied through cord sections 97 and 108, such as by a fish hooked below cord section 108, that force overcomes the friction between the trigger means 95 and notch 172 to pivot or rotate the trigger means 95 counter clockwise about pivot point 114 and away from the first lever member 89. This allows the two lever members 89 and 90 to pivot freely about pivot point 92. As force is applied to cord section 108, the cord section passing over pulley means 128 tends to pull the distal end 103 of the first lever member 89 toward the pulley 128 against tension forces applied by force means 117 to the distal end 123 of the second lever member 90 which is attached to the first lever member 89 by connecting means 91. Thus, the upper cord section 97 and the lower cord section 108 remain in a substantially vertical position as does the vertical lever member 88, while the first and second lever members 89 and 90 pivot or rotate about pivot point 92. The attachment points, lever lengths, force means and such like can be varied within this description to produce the desired force ranges, force multiplication and force patterns desired.

Figure 4:
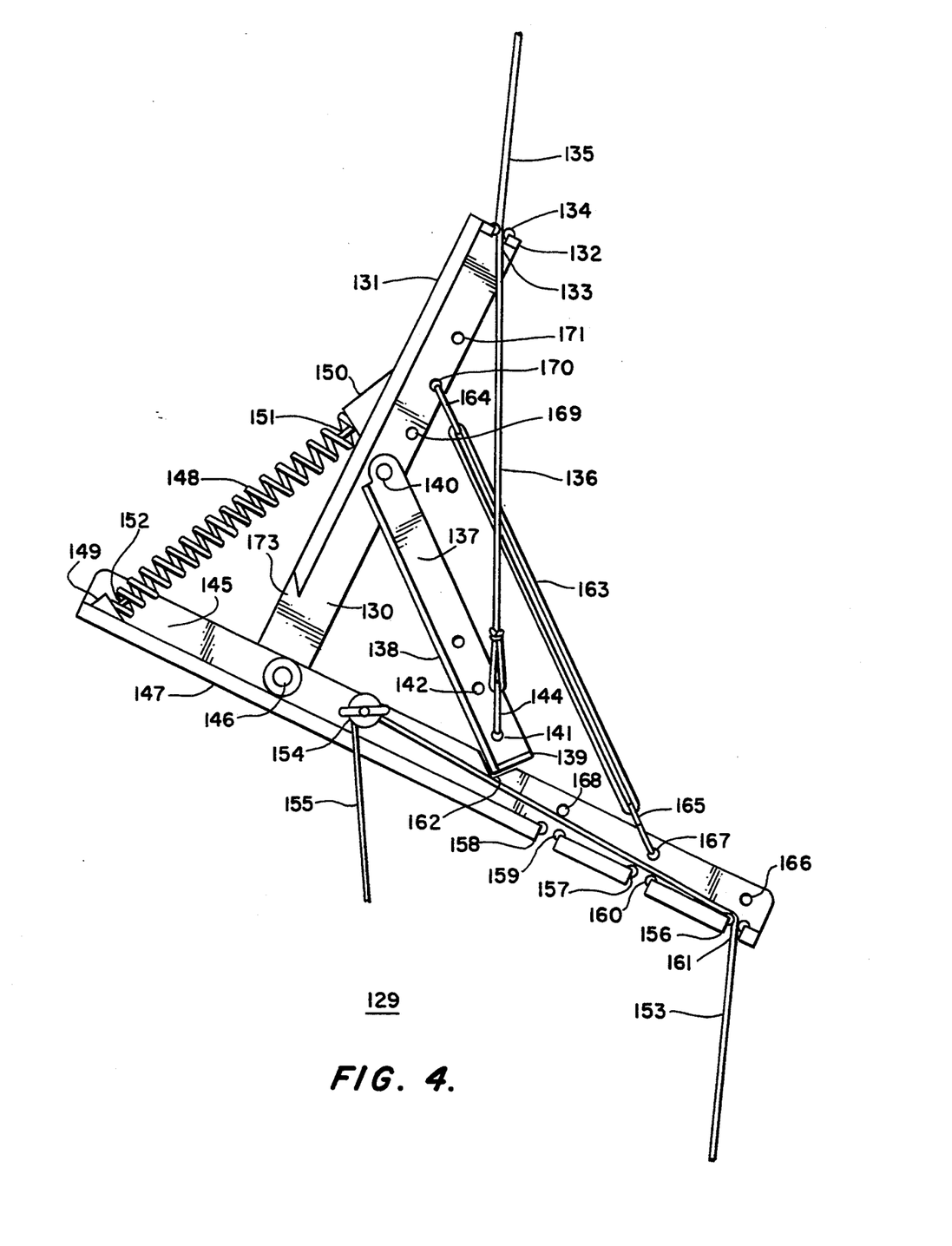
FIG. 4 is a side elevation of another embodiment of the invention showing several alternate and optional features.

FIG. 4 shows another embodiment of the invention with two types of force means. The hook setting apparatus 129 is supported by upper cord section 135 which depends from a conventional support means structure which is not shown. The cord section passes through line guide 134 which is mounted in hole 133 in end flange 132 which is near the upper or distal end of first lever member 130. From the line guide 134 the cord section 136 is connected to trigger means 137 at one of the attachment points shown as holes 141, 142 and 143 by S-hook 144. The S-hook makes it easy to quickly change the attachment point thereby changing the force required to disengage the trigger means 137 from the second lever member 145 at notch 162. Trigger means 137 is pivotably connected at pivot point 140 to the first lever member at a point near the middle of the first lever member. The location of the trigger means pivot point, as well as, the length of the various lever members, the strength of the force means and location of the cord sections also determine the force necessary to disengage the trigger means and the response characteristics of the hook setting apparatus components. Trigger means 137 is shown constructed of an L-shaped angle. In a preferred embodiment, the trigger means is made of ½ inch square aluminum angle and is about 4 to 6 inches long while the lever members are also ½ inch square angle and are each independently about 5 to 14 inches long. The particular length and size of each lever depends on the overall combination, multiplication of forces, pattern of forces and movement and response characteristics desired.

As shown in FIG. 4, a second lever member 145 is pivotably attached at a pivot point 146 to first lever member 130. Since the second lever member extends quite a distance behind pivot point 146 at 145 for cantilever mounting of the force means 148, a section of the side flange or rib section 131 of the first lever member is notched or cut away at 173 for clearance when the second lever member 145 moves clockwise relative to the first lever member 130. Second lever member 145 has a base or rib section 147 in which several cord passage points are shown as holes 156, 157 and 159. At each of the passages or ports a guide line is shown as 159, 160 and 161. These ports and guides allow the lower cord section 153 to pass through any of these points and decend downwardly to a hook apparatus and other conventional fishing paraphernalia which are not shown. The lower cord section 153 is attached to the second lever member 145 by an attachment means 154 which is shown as a wing nut, bolt and friction washers that allow the cord to be releasably attached so that the length can be varied as desired. Excess cord depends downwardly at 155 or it can be stored on the lever member or auxilliary components as described herein elsewhere. The apparatus shown has a force means 163 attached near the upper end of the first lever member 130 by an S-hook 164 at one of the attachment points shown as hole 169, 170 and 171. The other end of force means 163 is attached by S-hook 165 at one of the attachment points shown as holes 166, 167 and 168. The midsection of the force means is shown as an elastic band or rubber band. The size, strength, elastomeric material and points of connection determine the force and force pattern exerted by the force means. More than one elastic band can be used on a single set of attachment points or several separate elastic bands can be used at different attachment points as one tension means. All features shown in each drawing embodiment may not be essential for a complete hooking apparatus. That is, some features are optional or are used for certain conditions. As shown in FIG. 4, another type of force means 148 is mounted on the canti-levered portion of the second lever member 145. Mounting shoulders 149 and 150 with alignment pins 152 and 151 respectively are shown on the second lever member 145 and first lever member 130. As shown the force means is a coil spring shown at 148. This illustrates that the force means can be powered or actuated by convention means for exerting force as a tension force or as a compression force. Tension spring, compressible gas cylinders, leaf springs, coil spring, vacuum cylinders, and the like can be used as a part of or the sole force member of the tension means. Likewise, any one or several types of attachment points can be used at the attachment points through out the apparatus. For example, attachment points can be holes, friction mounting screws or bolts, spring clamps, cleats, pressure mounting screws or any other conventional mounting technique or apparatus. The cord or line used in this invention can be any one or more of several conventional types such as braided cord, monofilament or composite materials. The materials of construction of the lever members, trigger means, and other structural components can be metal such as steel, aluminum, stainless steel and other alloys, a composite such as fiberglass, carbon fiber materials, pure plastics, particulate filled or fiber filled plastics, wood and laminated materials. The methods of con struction, weather and water resistance, wear resistance, strength desired, weight and cost are among the factors that will determine which materials are used for each component. Plastic is used herein to cover natural and synthetic polymers, thermo setting polymers, thermo plastic polymers, condensation polymers, addition polymers, substituted polymers, crystalline polymers, amorphous polymers and combinations thereof. The lever members described herein can be referred to as elongated members meaning their length is at least 5 to 10 times the width or height.

Figure 5:
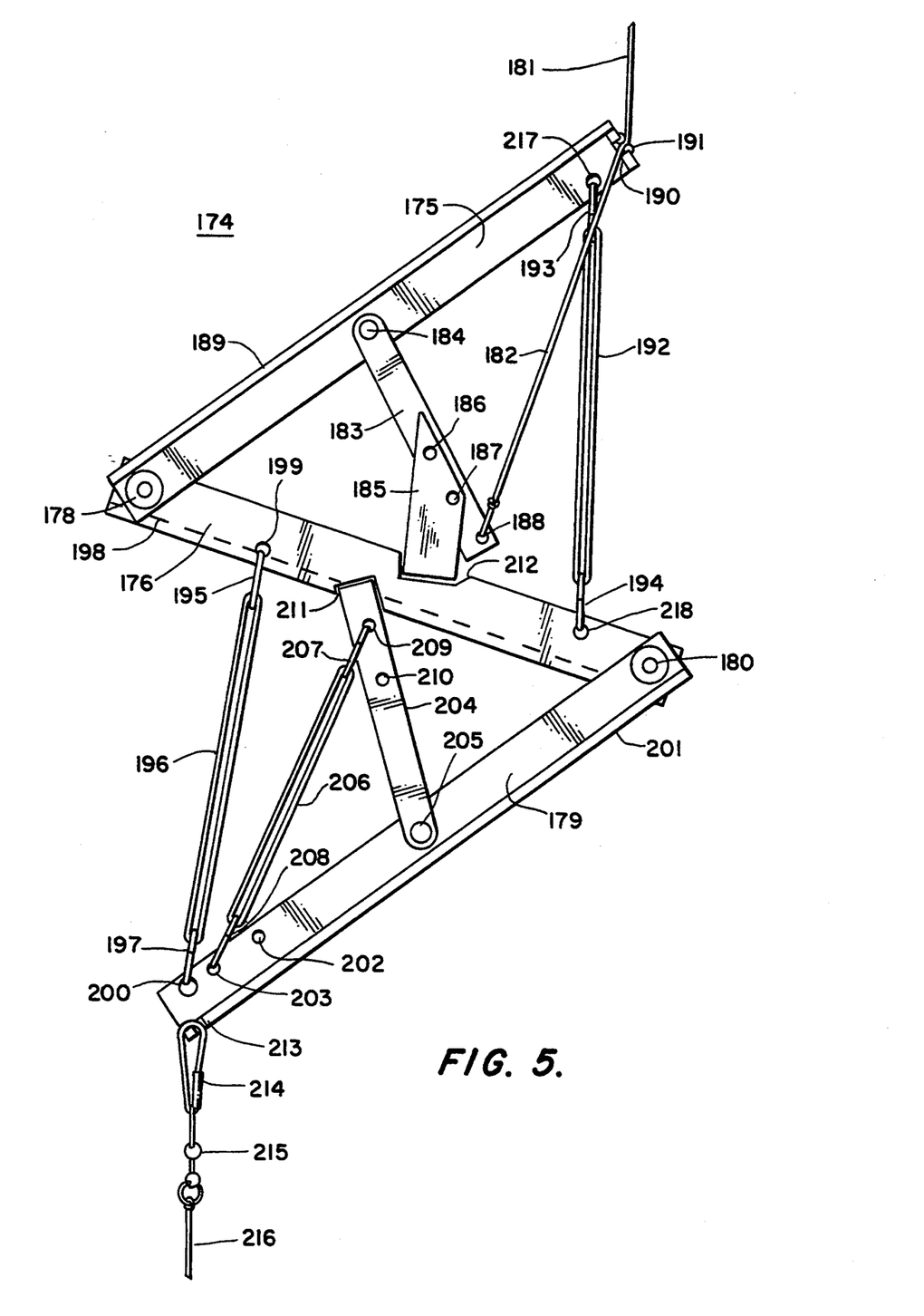
FIG. 5 is a side elevation of another embodiment of the inventions showing several alternate and optional features.

FIG. 5 describes other modifications and versions of the invention will be obvious to those skilled in the art from this disclosure and it will be readily apparent that this invention can be used with many or most coventional fishing apparatus or components.

FIG. 5 shows another embodiment of the invention which has more than one set of levers and two different types of trigger means. FIG. 5 shows a double set of levers with the upper lever member 175 and middle lever member 176 having a trigger member 183 operated by the tension on upper line member 181 and 182. This embodiment has a lower lever member 179 and the middle lever member 176 with a trigger member 204 that is operated by a force member 206. The relative action and tripping of trigger members 204 and 183 would be regulated by the force applied between the respective sets of levers by force means 206 and 192 respectively. With one combination, force means 196 would exert less force than force member 192 so that sufficient tension force applied between line members 181 and 216 would first rotate lower lever member 179 and middle lever member 176 about pivot point 180 to free trigger member 204 from notch 211 leaving these two levers to pivot freely about pivot point 180 a certain distance which would be proportional to each tension force applied to line members 181 and 216 and inversely proportional to the absolute amount and force pattern exerted by force means 196.

The upper trigger means 183 would be activated or released only when the tension force applied between line members 181 and 216 was of sufficient quantity and duration that the force applied through the lower lever 179 and force means 196 was sufficient to rotate upper lever 175 and middle lever 176 about pivot point 178 against the force exerted by force means 192 to free trigger means 183 from notch 212. Once both trigger members 204 and 183 were tripped or activated any force applied between lines 181 and 216 would tend to rotate each sets of levers against each force means to some degree. If the difference in the force level applied by force means 196 and 192 was small both would tend to move about the same amount for each application of force or tug on the lines 181 and 216. If the difference in force level for the force means 196 and 192 is larger then the set of levers operated by the force means with the lower force level would appear to flex of extend on each application of force to lines 181 and 216 and the other set of levers and force member would flex or extend only when the applied force and extension of the first set of levers reached certain levels. This combination could be used, as well as certain combinations of force means, to produce a dual or multiaction apparatus that could produce certain desired force patterns, such as a relative constant force level up to a certain level of extension and a second, usually higher, force level and maybe different force pattern upon further extension of the second set of levers and the entire hooking apparatus.

As shown in FIG. 5, the upper set of lever members, upper lever member 175 and middle lever member 176 and pivotably connected by pivot means 178. Each of these lever members are shown as angle of L shaped elongated levers with side flange portions 189 and 198 respectively. The side flange 198 on the middle lever member is shown by section lines to indicate the flange is turned away from the direction or position of lever members 175 and 179 for clearance. Other lever configurations can be used in view of the teachings herein. Upper lever member 175 is slideably connected through hole 190 in the lever end flange to upper, support, line member 181. A line guide means 191 is also shown positioned in hole 190 which can be used to reduce wear on the upper support line 181 and to apply any drag force desired to the line 181. The drag set by guide 191 would increase the level of tension force required on lines 181 and 216 to actuate trigger means 183 by the amount of force required to over come the drag created by guide 191.

In FIG. 5 a first or upper trigger means 183 is pivotably mounted on upper lever member 175. The upper trigger member 183 is shown as with substantially flat cross-section elongated lever. It can be of any other suitable shape for example L-shaped, I shapped, and such like. The trigger assembly shown has an extension or off-set 185 which is attached to the flat portion of the trigger lever by brads 186 and 187. Other attachment means can be used which include screws, bolts and nuts, cement, welding, forming of one material and such like. The flat portion of the trigger lever extends past the trigger off-set 185 to point 188 where the upper support line 182 connects to the trigger lever by a simple loop and knot. As shown any force applied to lines 181 and 216 would be transmitted through the portion of line at 182 to trigger lever 183 at point 181. When the force was sufficient to begin to over come the tension force applied by force member 192, the friction force between contact or extension member 185 and the notch 212 in middle lever 176. The friction force between trigger lever and notch in the middle lever can be set at desired level by using certain types of materials and by the shape of the notch. For example, the extension 185 can be made of a material of high or low coefficient of friction. A smooth spring steel off-set 185 would have a lower coefficient of friction than a soft, rough aluminum off-set. Certain plastic materials have an even lower coefficient of friction. The notch as shown in FIG. 5 can have a sloped section at 212 to increase contact and pressure as the trigger lever moves up against the ramp or slope. A straight cut notch would allow the friction force to decrease rapidly as the tension forces allow the upper lever member 175 and middle lever member 176 to move very slightly relative to each other. In fact, with friction engagement of the trigger lever and notch any movement of the levers appears to completely free the trigger lever from the notch. With support line operation of the trigger, such as shown for trigger lever 183, movement of the lever is generally slower than with a force member actuated trigger lever as shown at 204. With a support line operate trigger such as 183, the speed of operation is determined by the force applied to line 183, the point at which the line 182 attaches to the lever as shown at 188, the inertia of the trigger lever and the friction or drag in the pivot point connection 184. The one variable among these that can be adjusted the easiest is the point of connecting line 182 to the trigger lever. Several holes could be provided along the lever for adjustment. The further the point of attachment of line 182 is from pivot point 184 the less force required to move the trigger lever but the slower the trigger ever moves. If the line 182 is attached close to the pivot point a greater force is required to move the trigger lever but the trigger ever moves faster once it begins movement. With certain combinations of friction values the trigger lever 183 could be moved from notch 212 without moving upper lever member 175 and middle lever member 176. To do this the force applied through line 182 must be enough to over come the friction between trigger lever 183 and notch 212 while this force would be less than required to over come the force applied by force member 192. Force member 192 is connected to upper lever member 175 by S-hook 193 at hole 217 and to middle lever member 176 by S-hook 193 at hole 217 and to middle lever member 176 by S-hook 194 at hole 218. Force member 192 as shown is an elastic band that applies tension forces between the lever members.

As shown in FIG. 5, a second lever member set is shown below those described above. This set includes middle lever member 176 and lower lever member 179 which are pivotably connected at pivot point 180. The lower lever member is shown as an L-shaped structural member with a side flange 201. Somewhere near the middle of the lower lever member, trigger lever 204 is pivotably mounted on the lower lever member 179. The trigger lever can be mounted on the opposite lever member and designed to engage the adjacent lever member. The trigger lever can also be designed to pivot or rotate in either direction away from the notch is which the end rests. The notch 211 in middle lever member 179 is designed with a shoulder at 211 so that middle 176 and lower lever member 179 must move or pivot relative to each other at minimum distance sufficient for trigger lever 204 to clear the shoulder at 211 before the trigger can disengage from the middle lever member 176 and allow the two levers to pivot freely about pivot point 180 relative to each other in response to each tug or force applied to lines 181 and 216. Trigger lever 204 is shown pivotably mounted at point 205 on middle lever 179. The trigger lever 204 is shown with holes 210 and 209. Force member 206 is shown connected by S-hook 207 at hole 209 to the trigger means 204 and by S-hook 208 at hole 203 to lower lever member 179. Another hole is shown at 202 in which the force means 206 can be connected. When sufficient force is applied between lines 181 and 216 to move middle lever 176 and lower lever 179 a sufficient distance for trigger lever 204 to clear notch shoulder 211, trigger lever 204 is quickly pivoted or snapped away from middle lever 176 allowing it, to pivot freely relative to middle lever 176. Force member 196 is shown connected to middle lever 176 at hole 199 by S-hook 195 and connected to lower lever member 179 at hole 200 by S-hook 197. Force means 196 is shown as an elastic band but other means of applying force between the pivotably connected levers can be used in view of this disclosure. A lower line 216 is shown connected to the lower lever means 179 at hole 213 in the side flanged 201. The line 216 is connected using a snap or safety pin type removable hook 214 which is connected to a swivel means 215 through a lower ring to line 216. Line 216 would have other conventional fishing gear connected below point 216 which is not shown. Lined 181 would be attached above point 181 to some suitable support means and may have other conventional fishing accessories attached to or in the line as can line 216.

Other preferred embodiments of this invention can be assembled using components and variations of the embodiments shown and variations thereof. For example, embodiment can be fashioned simular to that shown in FIG. 1 but using a line actuated trigger such as in FIG. 5. Like wise in this embodiment the upper lever would be about 8–14 inches long and the lower lever would be about 6–10 inches long. If one continuous line was used for this embodiment a releasable friction type attachment would be used for the line on the trigger lever and sufficient extra line would be provided to allow free movement of the trigger lever and the lever members.

For each embodiment of the hooking apparatus, when a fish strikes or is hooked on the lower line such as on hook 14 and line 13 in FIG. 1 with sufficient force, the lower lever 3 is pivoted away from upper lever 2 about the pivot point. If the force is sufficient and the levers pivot far enough trigger means 6 is disengaged from contact with lower lever 3, each pull or tug on line 13 produce a movement of the levers relative to each other and the movement is inversely proportional to the strength or amount of force applied by force means 7. The hooking apparatus i is designed to maintain a force or tension on line 13 against the force exerted by a fish and thereby hook or catch a fish that might be able to work slack into line and throw the hook to get away. The apparatus also maintains a relatively constant force or an amount of force from a preselected pattern of force on the line 13 and hook while allowing movement over a predetermined distance thereby preventing the fish from exerting a sudden shock or high value of force which might break the line or bend the hook allowing the fish to escape.

In the broadest sense the essential features of this invention can be described as follows:

A lever operated hooking apparatus comprising at least one set of pivotably connected lever members wherein said lever members are pivotably connected single levers having at least one force means connected near the distal end of each of said lever members so that said force member is exposed and one of said lever members has connected near the distal end a supporting cord member and the other ever member has connected near the distal end a depending cord member having a hook attached thereto.

We claim:

1. A lever operated hooking apparatus comprising at least one set of pivotably connected lever members wherein said lever members are single levers pivotably connected near one end having at least one force means connected near the distal end of each of said lever members so that the first of said lever members has connected near the distal end a supporting cord member and the other lever member has connected near the distal end a depending cord member having a hook attached thereto, wherein said apparatus has a hook setting apparatus for setting a hook supported by a line and maintaining tension on said line within a predetermined distance of movement for said hook and line comprising;

a first elongated support member oriented in a generally vertical position having a second elongated support member pivotably attached at a first pivot point near the lower end of said first support member, with an upper cord member slideably engaging the upper end of said first elongated support member;

a trigger means pivotably mounted on said first support member at a second pivot point intermediate between said lower end and upper end of said first support member with said upper cord attached to said trigger means and adapted to pivot said trigger means about said second pivot point toward said upper end of said first support member and said trigger means being adapted to engage said second support means in a manner to restrict rotation of said first and second support members relative to each other;

an upper cord member attached near the upper end of said first elongated support member with its upper end attached to a fixed support, slideably engaging said first support member, and pivotably attached to said trigger means and adapted to transmit force from said fixed support to said trigger means; thereby causing said trigger means to pivot and disengage from said second support means;

a second cord member attached to said hook setting apparatus so that said second cord member depends from the distal end of said second lever member at a predetermined distance from said first pivot point with a hook means supported by the lower end of said second cord member with said second cord member being adapted to transmit force applied to the distal end of said second support member as a downward force is applied to said hook means:

a tension means attached to said first support means near its upper extremity and attached to said second support member at a point a spaced distance from said first pivot point and being adapted to cause said first support member and said second support member to pivot about said first pivot point towards each other and engage said trigger means except when said trigger means is pivoted by said upper cord member to disengage said second support member allowing further movement of said first and second support members relative to each other and said tension means being adapted to maintain tension between said upper cord member and said second cord member when said trigger means is disengaged.

2. In the apparatus of claim 1, a lever operated hook setting tension apparatus comprising:

a first elongated lever member having a generally planar vertical cross section being oriented in a generally vertical direction with its upper distal end being supported by a substantially vertical first cord section and having a second lever member pivotably mounted near the proximate end of said first lever member and at a point between the middle and upper end of said second lever member;

said second lever member being pivotably mounted on said first lever member and having a second cord section attached near the lower distal end and depending therefrom with said second cord section depending in a substantially vertical direction with a hook apparatus attached to the lower end of said second cord section, and said second lever member having an upper distal end extending from said pivot point in a generally upward direction with an actuating means attached at one end near said upper distal end of said second lever member;

said actuating means being attached at its second end at a point on said first lever member in a manner whereby said actuating means tends to pivot said first lever member and said second lever member about said pivot point in a direction forcing the distal ends of each lever member bearing said cord sections toward each other;

a trigger means pivotably attached to one lever member and adapted to releasably engage the other lever member thereby releasably holding said lever members in a fixed relationship with each other until said trigger means is disengaged from said other member by a tension means adapted to pivot said trigger means from engagement when a predetermined tension is applied between said first and second cord sections;

and said actuating means being adapted to maintain a predetermined tension on said first cord section and said second cord section as said cord sections move through a predetermined generally vertical distance.

3. An apparatus of claim 1 wherein said trigger means is adapted to engage a support lever means by friction.

4. An apparatus of claim 1 wherein said trigger means is adapted to engage a support lever means by at least one notch in said support lever so that said trigger means moves only when a certain predetermined tension is applied between said cord sections so that said support levers move relative to each other a predetermined distance.

5. An apparatus of claim 1 wherein said first and second cord sections are portions of one continuous cord.

6. An apparatus of claim 5 wherein said cord sections are releasably attached to said support members at preselected points.

7. An apparatus of claim 1 wherein said force member can be moveably attached to said lever members at various predetermined points along said lever members thereby producing proportional tension patterns in said cord sections with movement of the said lever members for each different attachment pattern.

8. An apparatus of claim 1 wherein said force member is attached to said lever members so that said cord sections bear a lower tension force than said force member bears.

9. An apparatus of claim 1 wherein said force member is attached to said lever members so that said cord sections bear a greater tension force than said force member bears.

* * * * *